United States Patent Office 3,515,097
    Patented June 2, 1970

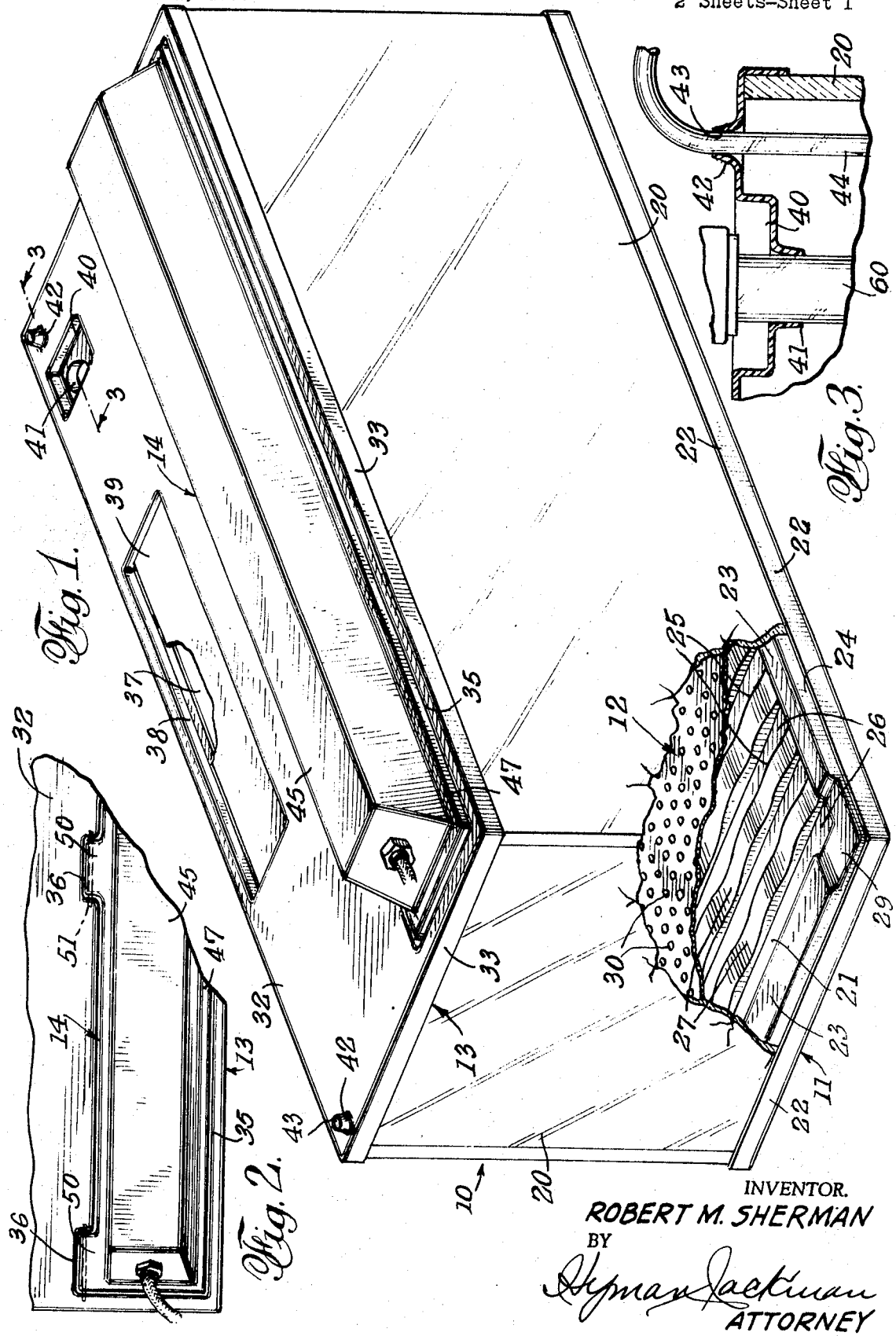

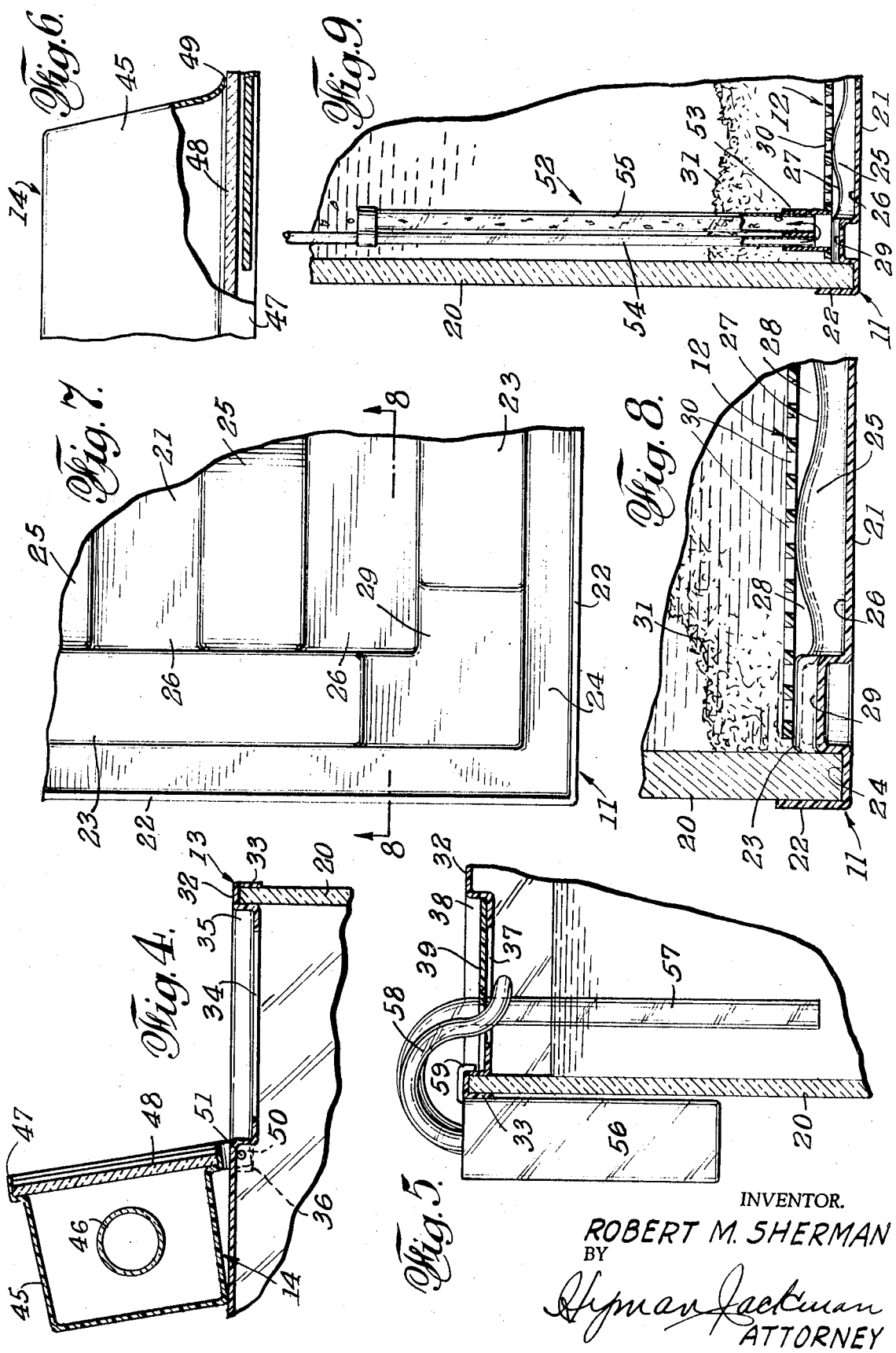

---

3,515,097
    AQUARIUM ASSEMBLY
    Robert M. Sherman, Beverly Hills, Calif., assignor to Aquaria, Inc., Los Angeles, Calif., a corporation of California
    Filed June 2, 1969, Ser. No. 829,320
    Int. Cl. A01k *64/00*
    U.S. Cl. 119—5                                4 Claims

---

ABSTRACT OF THE DISCLOSURE

An aquarium assembly comprising a thin-walled, stiffened base tray of plastic material, a transparent tank body fitted into said tray, and a thin-walled top of plastic material removably fitted on said body and provided with a hinged light housing for illuminating the interior of the body from above and, when swung back on its hinge, opening an elongated opening in said top to afford access to the interior of the tank body; said base tray combining with a perforated gravel-supporting cover plate thereupon to support a biological filter for controlling the waste buildup in the tank, and the cover affording support for sundry tank-serving devices, as heaters and filters.

---

BACKGROUND OF THE INVENTION

Improving the structural, functional and appearance features of home-type aquaria and, further, improving safety characteristics to minimize stresses that are imposed by the several hundred pounds of water contained therein and which are frequently great enough to cause fracture of inelastic aquaria bottoms unless freely and carefully supported.

SUMMARY OF THE INVENTION

The present aquarium assembly is realized in the combination of a transparent tank body open at the top and bottom, the same fitting in and being cemented to a thin-walled and self-stiffened plastic base tray that is covered by a perforated gravel-supporting plastic cover plate which cooperates with the tray to form spaces and passages that constitute a biological filter in which flow is created by stack means supported by the cover plate, and of a thin-walled top of plastic material removably fitted over the open top of the tank body and provided with a hinged light housing that normally illuminates the interior of the tank body and, when swung back on its hinge, exposes an access opening in said tank top. The latter is provided with means for operatively supporting a heater, filters and various devices ordinarily employed for attending to the requirements and care of aquaria.

The invention has for an object to provide the means above generally outlined and also comprises means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, which is based on the accompanying drawings. However, said drawings merely show, and the following description merely describes, one embodiment of the present invention, which is given by way of illustration or example only.

BRIEF DESCRIPTION OF THE DRAWINGS

In the drawings, like reference characters designate similar parts in the several views.

FIG. 1 is a partly broken perspective view of an aquarium according to the present invention.

FIG. 2 is a broken plan view of the forward left portion of the aquarium.

FIG. 3, to an enlarged scale, is a fragmentary sectional view as taken on the line 3—3 of FIG. 1.

FIG. 4 is a fragmentary cross-sectional view of the top of the aquarium showing the light housing swung to open position.

FIG. 5 is a fragmentary view showing the manner and means for providing the aquarium with a siphon-type filter.

FIG. 6 is a front view, partly in section, of the far right end of the light housing.

FIG. 7 is a fragmentary and still larger-scale view of a corner of the base tray of the aquarium.

FIG. 8 is a cross-sectional view as taken on the line 8—8 of FIG. 7.

FIG. 9 is a fragmentary vertical view showing a biological filter operatively connected to the base tray portion of the aquarium.

DESCRIPTION OF THE PREFERRED EMBODIMENT

The aquarium that is illustrated comprises, generally, a transparent tank body 10, a base tray 11 into which the lower end of the tank body 10 is fitted, a perforated gravel-supporting plate 12 disposed upon said tray and defining a biological filter therebetween, a top or cover 13 removably disposed upon the upper end of said tank body, and a light housing 14 hingedly connected to said top.

The tank body 10, in this instance, is shown as of rectangular form and comprising sides or walls 20 that are joined at the corners by a suitable waterproof adhesive and, as shown, without corner trim or other metal members, as is common in structures of the present type. The result is a trim and neat appearance, unobstructed visibility of the interior of the tank and, of primary importance, the removal of metal from any possibility of introducing rust or other contamination into the tank water and thereby deleteriously affecting the welfare of fish in the aquarium, that may be damaged physiologically or pathologically. The sides may be formed of glass and/ or any of the high-impact transparent plastics.

The base tray 11 may comprise sheet plastic. The particular polymeric material or synthetic resin employed is not material, provided the same is form-retaining and either substantially rigid or approximately so, and resists distension and undue deformation in thickness of the nature of $\frac{1}{16}$ inch. The same may be thermosetting or thermoplastic.

The tray that is shown is formed to have a bottom 21 that is circumscribed by an upturned flange 22. The latter and an inner embossment 23 paralleling said flange define a recess 24 of a size that, as seen in FIGS. 1, 7, 8 and 9, receives the lower edge of the tank body 10, suitable waterproof adhesive being used to cement the connection.

In one direction, preferably transversely, the bottom 21 is provided with upwardly formed stiffener embossments 25, the same extending between the longitudinal portions of the inner embossments 23 and defining between them transverse channels 26. By providing undulating top faces 27 or in other similar ways, said channels 26 are connected across the low portions thereof, as suggested by the spaces 28 in FIG. 8.

At one or more of the corners of the embossment 23, the same is lowered or depressed as at 29. Thus, there are provided in the upper surface of the base tray 11 channels and connecting spaces that allow circulation or movement of the lower portion of the body of water in the tank, the reason for which will become clear hereinafter.

The gravel-supporting plate 12, of a plastic material similar to that of the tray 11, is loosely fitted into the interior of the tank body and rests upon the high portions of the embossments 23 and 25 of the base tray 11, as best seen in FIGS. 8 and 9, it being clear that the holes 30 in said plate, of whatever form, pass the water in the tank to said channels 26 and the spaces and depressions that connect them. The same, however, forms a support for gravel or sand 31 which allows water to be drawn therethrough, regardless that some particles thereof may fall through the holes. As mentioned, a bilogical filter is thereby formed by said tray and plate.

The top ore cover 13, of a resin material of the nature above indicated, is formed to have a top wall 32 that is circumscribed by a downturned flange 33, the same and the flange 22 of the bottom 11 framing the respective upper and lower ends of the tank body 10.

Along one edge, preferably the front, the wall 32 is provided with an elongated opening 34 that is formed in a depressed seat 33. The front portion of said seat 35, as can be seen in FIG. 4, cooperates with the front flange 33 to fit over the upper edge of the front wall of the tank. As seen in FIG. 2, said seal 35 is formed to have rearwardly offset recesses 36.

In the rearward portion of the top wall 32 there is provided an opening 37 formed in a seat 38 of lesser length than that of the seat 35. A thin cover plate 39 loosely fits in said seat to cover said opening 37. The material of said plate is such that the same may be cut by scissors or by a knife to remove portions thereof for reasons later evident. Said top wall may also be provided with a relatively smaller seat 40 adjacent one end of the top, the bottom of said seat being provided with a downwardly flanged hole 41. At the rear corners of said top wall 32 are provided conical projections 42, each surrounding a hole 43. Said projections may be cut off at varying heights above the level of the wall 32, thereby providing said holes with a size adapted to receive and snugly engage a flexible air tube, as indicated at 44 in FIG. 3.

The light housing 14 is shown as an inverted receptacle 45 which is added to carry and house a neon or similar lamp 46. The lower portion 47 of said housing is formed as an open frame, as shown in FIG. 4, and is somewhat enlarged to fit loosely in the seat 35, as indicated in FIGS. 1 and 2. A transparent or translucent panel 48 closes the open side of the housing 14, the same being conveniently insertable and removable by being slid through an end slot 49 in the housing.

The mentioned enlarged portion 46, as shown in FIG. 2, is provided with rearwardly projecting ear portions 50 that loosely fit the offset recesses 36 of the seat 35. A non-metallic hinge pin (nylon, for instance) 51 extends longitudinally through each ear portion 50 and into adjacent ends of the recesses 36, thereby providing a non-corrosive hinge on which the light housing 14 is movable between the positions of FIGS. 1 and 4.

A conventional stack 52 for the biological filter is shown in FIG. 9. The same, in normal installations, is provided with a separate perforate base which is placed upon the usual glass bottom of conventional aquaria to form the usual biological filter. The expense of such a base which, moreover, is of relatively small operative capacity, is saved by directly fitting the base 53 to a corner of the plate 12 above one of the depressions 29. Thus, air pumped into the tube 54 is forced into the water occupying said depression 29 and then, in the form of air bubbles, rises in the tube 55 and discharges from the upper end thereof, either into the tank water or thereabove. The mentioned channels 21 and spaces 28 permit flow of water toward the depression 29, thereby setting up a convection-type filtering movement of the water which hastens bacterial consumption of wastes in the water. One such stack may be provided at one or at more than one corner of the aquarium.

The flexible tube 44 above mentioned my be connected to the tube 54 to provide the air above mentioned, the described projections 42 providing means for allowing bending of said tube and yet obviating the same being pinched or contracted and thereby unduly reducing air flow.

FIG. 5 shows another type of filter 56 that may be used with the top cover 13, as described. Such a filter, conventionally provided with one or more siphon tubes 57 and a return line 58, may be hung by a hanger hook 59, as shown. The plate 39, as indicated, may be cut, slitted or otherwise bent or removed in part, to accommodate said tubes 57 and 58. Both types of filters may be used.

The flanged hole 41 may frictionally engage an item such as a heater 60 which can be raised and lowered, as required, retaining its adjusted position due to the frictional engagement of the heater with the flange of said hole. The latter may be conically restricted to safely retain such adjustment.

Except for the lamp sockets and terminals, which in any case are remote from the interior of the tank, all of the above-described components of the present aquarium are totally nonmetallic.

While the foregoing has illustrated and described what is now contemplated to be the best mode of carrying out the invention, the construction is, of course, subject to modification without departing from the spirit and scope of the invention.

Having thus described the invention, what is claimed and desired to be secured by Letters Patent is:

1. In an aquarium having a transparent tank body open at least at one end, and formed of substantially inflexible sides,
a thin-walled base tray of synthetic resin closing the bottom end of the tank body and formed to have a bottom wall,
an outer flange extending upwardly from said bottom wall and fitting directly over the outer faces of the body sides,
said body sides at the open end of the tank body being engaged with said tray bottom and in fitting contact with the inner faces of the flange thereof,
an inwardly spaced embossment paralleling said flange and defining a recess between itself and the flange for receiving the lower edge of the tank body, and adapted to be joined to said tank edge adhesively, and
a plurality of stiffener embossments in the tray bottom within the portion thereof interior of the mentioned inwardly spaced embossment,
said bottom wall, outer flange, inwardly spaced embossments, and the stiffener embossments being of substantially uniform thickness, whereby the sheet form of the tray, form-retention, substantial rigidity, and resistance to distention and deformation are obtained.

2. In an aquarium according to claim 1:
a thin-walled cover of synthetic resin for the top of the tank bod yand formed to have a top wall and an outer flange extending downwardly from said top around and directly fitting the outer faces of the sides of the tank body, an elongated opening being provided in said top wall adjacent one longitudinal edge of said cover,
a light housing longitudinally coextensive with said opening, and
hinge means connecting the rear edge of said housing to said cover wall along the rear edge of the opening therein for movement of said housing on the hinge means between a position closing the opening in the cover wall and a position swung upwardly and rearwardly exposing all of said opening in the cover wall for access therethrough to the interior of the tank body.

3. In an aquarium according to claim 2:
the light housing having an open bottom circumscribed by an enlarged frame, one end of said frame having a slot therein, and a light-enclosing panel slidably fitted in said frame by insertion through said slot.

4. In an aquarium having a transparent tank body open at least at one end, a thin-walled base tray of synthetic resin closing the bottom of the tank body and formed to have a bottom wall, an outer flange extending upwardly from said bottom wall, and the open end of the tank body being adapted to be engaged with said tray bottom and in fitting contact with the inner faces of the flange thereof, an inwardly spaced embossment paralleling said flange and defining a recess between itself and the flange for receiving the lower edge of the tank body, and adapted to be joined to said tank edge adhesively, a plurality of stiffener embossments in the tray bottom within the portion thereof interior of the mentioned inwardly spaced embossment, the stiffener embossments defining channels therebetween, a perforated plate supported by the upper faces of the inwardly spaced and the stiffener embossments for supporting a quantity of gravel within the tank body, said stiffener embossments having depressions in their upper faces defining connecting water passages between the mentioned channels, the inwardly spaced embossment having at least one depression in communication with the water moving beneath the perforated plate between the mentioned channels, said tray and plate combining to form a biological filter, and a biological filter stack being mounted on the perforated plate above the mentioned depression in the inwardly spaced embossment and in operative communication with the filter.

References Cited

UNITED STATES PATENTS

| | | | |
|---|---|---|---|
| 3,018,758 | 1/1962 | Arnould | 119—5 |
| 3,066,645 | 12/1962 | Mulder | 119—5 |
| 3,119,774 | 1/1964 | Arak | 210—169 |
| 3,125,065 | 3/1964 | Willinger | 119—5 |
| 3,167,051 | 1/1965 | Hovlid | 119—5 |
| 3,316,882 | 5/1967 | Renwick | 119—5 |

ALDRICH F. MEDBERY, Primary Examiner

U.S. Cl. X.R.

210—169